Dec. 21, 1954    J. FEATONBY    2,697,326
REACTOR WITH ADJUSTABLE STATOR BLADES
Filed April 30, 1951
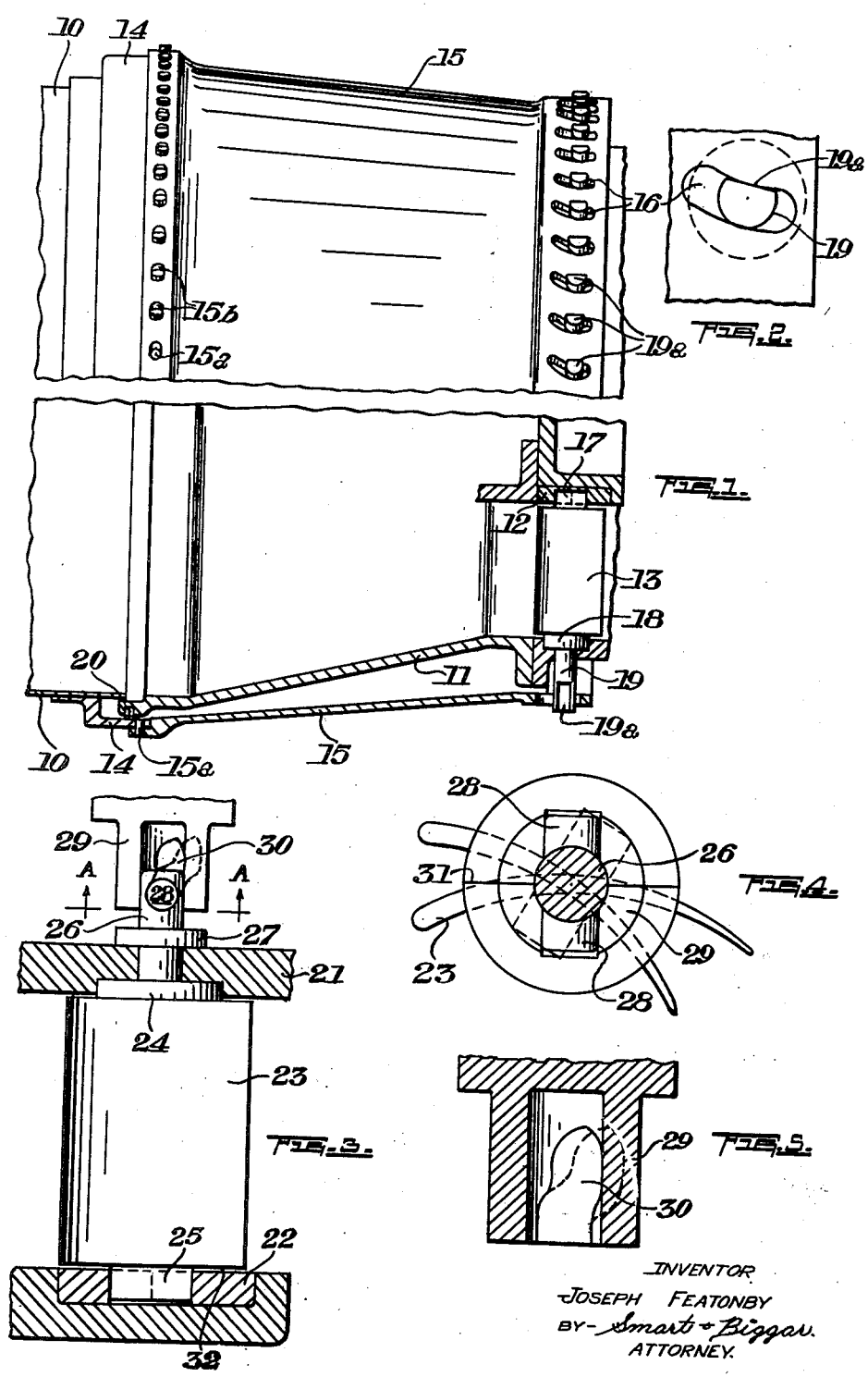
INVENTOR
JOSEPH FEATONBY
BY Smart & Biggar
ATTORNEY.

United States Patent Office

2,697,326
Patented Dec. 21, 1954

2,697,326

REACTOR WITH ADJUSTABLE STATOR BLADES

Joseph Featonby, Ottawa, Ontario, Canada, assignor to National Research Council, Ottawa, Ontario, Canada, a corporation of Canada Application April 30, 1951, Serial No. 223,673

4 Claims. (Cl. 60—39.25)

This invention relates generally to reactors, and more particularly to means for varying the angles of attack of at least some of the stator blades of a reactor. By the term reactor, as used in this specification and claims, I mean any steam or internal combustion turbine or compressor.

It has been appreciated by designers of reactors for many years that a substantial improvement in performance and efficiency is obtainable by varying the angles of attack of the stator blades (i. e. varying the nozzle openings) in accordance with the loading of the reactor.

The provision of variable nozzle openings permits of rotor and stator blading design which yields a higher efficiency with a lower Mach number at the entry to the rotor blading. Where the angles of attack of the stator blades are variable, the probability of reaching the "choking point" in, say, a high compression ratio turbine would be greatly reduced and "blow off" in starting may be obviated.

Despite these attractive possibilities, it is still normal practice to design reactors with the angle of attack of the stator blades fixed, since no simple practical means has been provided for varying the nozzle openings according to load. I am well aware that there have been many proposals for accomplishing this desirable variation of the blades, but none of the prior proposals known to me have been sufficiently simple and effective to lead to any wide acceptance.

In contrast to these complicated mechanical adjusting devices which are controlled manually or by temperature responsive devices, I adjust the angles of attack of stator blades of a reactor by means of a simple mechanical arrangement which is directly actuated in a positive manner by the "thermal growth" of the reactor, a factor which has previously been regarded only as a handicap in the design of turbines and compressors.

It is interesting to note that, while, as pointed out above, it has been known for years that it would be advantageous to be able to vary the nozzle openings, it is today common practice to use non-adjustable stator blades and to give the leading edges of the rotor blades a greater thickness than the optimum for efficiency in order that the reactor may give a reasonable performance off the design point. With this compromise, when the reactor is running off the design point, the rotor blades offer a better angle of reception to the gases flowing from the reactor nozzles, but the efficiency of the reactor at its design point is reduced due to the increased thickness of the leading edges of the rotor blades and the consequent reduction of the area for passage of the gases. The relative Mach number is increased and may become critical. That this unsatisfactory compromise is tolerated, is, I feel, evidence that the prior proposals for varying the angles of attack of stator blades are either inoperative or complicated to the point of impracticability.

My simple proposal for utilizing the thermal growth of the reactor components to vary the nozzle openings with temperature permits rotor blade design which offers a more efficient reception angle to the gases flowing to the rotor blades from the adjustable stator blades. Improved performance both at and off the design point results from my proposal.

The apparatus according to my invention may generally be defined as a reactor having at least one stage of stator blades and at least one stage of cooperating rotor blades, a plurality of the blades in at least one of the stator stages being adjustable, and means for varying the angles of attack of the adjustable blades comprising means for mounting each of the adjustable blades to rotate about an axis which is fixed with respect to the stator casing, an element projecting from each adjustable blade, and means for mounting said projecting elements for controlled sliding movement in a portion of the structure substantially differently affected by the heat developed during operation of the reactor than the stator casing, the two said mounting means cooperating to rotate the adjustable blades and vary the flow characteristics through the reactor as thermal growth of the reactor causes relative movement of the stator casing and said portion.

I propose to describe in detail two embodiments of the invention as applied to a turbine. It should be appreciated, however, that the invention may be applied with advantage to the adjustment of stator blades in a compressor, and an example of such an application will be briefly set out hereinafter.

In drawings which illustrate embodiments of the invention applied to turbines:

Figure 1 is a side elevation, partly broken away, of an embodiment in which axial thermal growth is utilized, Figure 2 is a detail of one of the slots of the embodiment shown in Figure 1, Figure 3 is a fragmentary section of a second embodiment in which radial thermal growth is utilized, Figure 4 is a section on the line A—A of Figure 3, and Figure 5 is a detail of one of the slots of the embodiment shown in Figure 3.

Referring first to Figures 1 and 2, reference numeral 10 indicates the wall of the combustion chamber of a gas turbine, 11 indicates the outer stator casing, and 12 the inner stator casing. A plurality of stator blades, one of which is indicated at 13, extend between the two stator casings and are each mounted to rotate about an axis which is fixed with respect to the stator casing. A circular flange 14 extends around the combustion chamber at the end adjacent the stator, the flange being rigidly secured to the combustion chamber wall 10. A tubular member 15 is secured to flange 14 by means of a row of pins 15a which project radially from the flange, and extend through a row of slots 15b formed at one end of member 15. Slots 15b are elongated transversely of member 15, so that tubular member 15 is permitted limited rotational movement with respect to flange 14. The reason such movement is provided for will appear hereinafter. Tubular member 15 is generally concentrically disposed with respect to the stator casing, being spaced some distance outwardly therefrom and enveloping the outer casing 11. Member 15 is provided with a second series of slots 16, which, while they may be generally described as longitudinal slots (since they extend generally parallel to the longitudinal axis of the stator) are actually arcuately curved in a direction which is angular with respect to the stator axis.

Blade 13 is mounted for rotation within the stator casing by a cylindrical boss 17 disposed within a cylindrical recess in casing 12 and a cylindrical boss 18 which is received in a cylindrical recess in outer casing 11. Bosses 17 and 18 are preferably integral with the blade 13, but are in any event fixed with respect thereto. A rod-like member 19 projects axially from, and is rigidly secured to (or is integral with) boss 18, so that rotation of projecting member 19 will bring about rotation of blade 13 about an axis which is fixed with respect to the stator casing. One side of projecting member 19 is flattened over the end portion thereof as indicated at 19a. The flattened end 19a of each member 19 extends through one of the arcuate slots 16 in member 15, and is snugly engaged by the sides of the slot.

The combustion chamber 10 and the stator casing are connected to one another by means of an expansion joint 20. By virtue of this joint, while any axial expansion or contraction of combustion chamber 10 is directly passed to member 15, such movement is taken up by the expansion joint 20, and is therefore not imparted to the stator casing 11. Heating or cooling of the combustion chamber 10 therefore causes relative axial movement of the member 15 (having the slots 16) and the outer stator casing 11. As the slots 16 move back and forth under the influence of temperature changes in the combustion chamber 10, the flattened end portions 19a of projecting members 19 are forced to follow the curving of the slots 16, and the blades 13 are forced to rotate. The amount of rotation imparted to the blades is governed by the temperature range of the combustion chamber, the coefficients of expansion of the metallic members affected by the temperature changes, and the degree of curvature of the arcuate slots. As slots 16 move back and forth, the curvature of the slots brings about rotation of member 15 with respect to flange 14, the movement being permitted by sliding of pins 15a in the transversely elongated slots 15b.

While Figure 1 illustrates turning of but one stage of stator blades, it will be appreciated that any number of stages may be adjusted in similar fashion merely by extending member 15 and providing additional rows of slots 16.

Turning to Figures 3, 4, and 5, 21 indicates the outer stator casing and 22 the inner stator casing of a turbine, while 23 is a stator blade which is mounted for rotation about an axis which is fixed with respect to the stator, the mounting means consisting of cylindrical bosses 24 and 25 fixed to opposite ends of blades 23 and seated in cylindrical recesses in outer casing 21 and inner casing 22 respectively. Bosses 24 and 25 are preferably integral with blade 23, but are in any event fixed with respect thereto. A rod-like member 26 projects axially from boss 24, passing through casing 21 and projecting therewithout. A collar 27 is fixed to projecting member 26 where the latter emerges from stator casing 21; and two diametrically opposed transverse projections 28 extend from projecting member 26 adjacent the free end thereof.

A sleeve 29 is mounted in a portion of the structure relatively unaffected by the heat developed during operation of the turbine, and two similar but diametrically opposed arcuate slots 30 are provided in the sides of sleeve 29. Slots 30 are slightly wider than the diameter of the projections 28. The free end of projecting member 26 is disposed within sleeve 29, with the projections 28 riding in the arcuate slots 30. (Sleeve 29 is partable for assembly purposes as indicated at 31 in Figure 4.)

A plurality of stator blades may be adjustably mounted as described above in connection with blade 23 and the angle of attack of these blades is varied in accordance with the temperature of the motive gases in the following manner. The hot gases passing through the turbine cause turbine casings 21 and 22 to expand. Sleeve 29 will be relatively unaffected by the heat developed and will remain at a relatively fixed radial distance from the longitudinal axis of the stator casing. Radial outward expansion of outer stator casing 21 moves collar 27 outwardly and projecting member 26 is carried further into sleeve 29. As member 26 penetrates sleeve 29 more deeply the projections 28 are forced to slide in the arcuate slots 30, and the curvature of the slots forces projecting member 26 to rotate. Rotation of projecting member 26 in turn rotates the blade 23.

It will be appreciated that where radial expansion of the stator casing is used to impart rotation to the stator blades as described above, allowance must be made for the axial expansion of the stator casing since projections 28 are riding in a portion of the structure relatively unaffected by the expansion. With this in view, sleeve 29 is so mounted that it is movable longitudinally of the stator, but radical movement or rotation is prevented.

Since the outer stator casing 21 will expand and contract in advance of the inner casing 22, I recommend that a clearance, as indicated at 32, be left between the blade 23 and the inner stator casing 22 to avoid damage of the blade. (Some similar precaution should also, of course, be taken in the case of the blades 13 of Figure 1.)

Radial outward expansion of casing 21 in advance of casing 22 introduces a problem of leakage between the inner end of blade 23 and the inner casing 22. This leakage may be avoided by increasing the diameter of boss 25 so that the enlarged boss shrouds the area where leakage might otherwise occur. If, however, the bosses 25 of adjacent blades were enlarged sufficiently to completely shroud the area of potential leakage, they would interfere with one another.

I should also like to point to the advisability of leaving adequate clearance between projecting member 26 and sleeve 29 on the one hand, and between projections 28 and slots 30 on the other hand, since otherwise binding may occur due to the fact that elements 26 and 28 are more affected by heat than the sleeve and its slots. Sufficient clearance to avoid binding due to differing rates of expansion should also, of course, be provided between the flattened end portions 19a of projecting elements 19, and the arcuate slots 16, in the case of the embodiment shown in Figures 1 and 2.

Referring again to the structure shown in Figures 1 and 2, I would like to point out that generally similar principles utilizing axial thermal growth may be applied to automatic adjustment of the stator blades of a compressor.

What I claim is:

1. A reactor including a combustion chamber, a bladed rotor, an outer stator casing, an inner stator casing, an expansion joint between said combustion chamber and said outer stator casing, a tubular member secured to said combustion chamber adjacent the expansion joint and enveloping said outer stator casing, a plurality of adjustable stator blades rotatably mounted in said stator by means of bosses fixed to the opposed ends of said blades and recesses in said inner and outer casings for the reception of said bosses, an element projecting radially from each adjustable blade, said projecting elements having flattened end portions, and a series of arcuate generally longitudinally extending slots in said tubular member, the flattened end portions of said projecting elements passing through said slots, said flattened end portions riding in said arcuate slots and imparting rotation to said rotatably mounted blades as axial thermal growth of the reactor causes relative movement of said tubular member and said stator casing.

2. A turbine or compressor apparatus comprising a combustion chamber, a stator casing, at least one stage of stator blades, a plurality of the blades in at least one of the stator stages being adjustable, and means for varying the angles of attack of the adjustable blades comprising a tubular casing surrounding said stator casing and spaced outwardly therefrom, an expansion joint between the combustion chamber and said stator casing, a mechanical connection between the combustion chamber and the other of said casings whereby axial thermal growth of said combustion chamber is imparted to said tubular casing, the presence of said expansion joint and said connection causing said stator casing and said tubular casing to move relative to one another whenever there is an appreciable change in the temperature of said gases, means secured to each of said adjustable blades and mounted in said stator casing whereby each adjustable blade is rotatable about an axis which is fixed with respect to the stator casing, an element projecting from each of said rotatably mounted adjustable blades, and a plurality of arcuate guide slots in said tubular casing, said projecting elements being operatively connected with said guide slots, said guide slots being arranged to dictate the direction of movement of said projecting elements with respect to said tubular casing and impart rotation to the rotatably mounted blades whenever thermal growth of the apparatus causes relative movement of said tubular casing and said stator casing.

3. An apparatus as defined in claim 2, in which all the blades of one stage are adjustable.

4. An apparatus as defined in claim 2, in which said guide slots extend generally longitudinally in said tubular casing and in which said projecting elements have flattened end portions, said flattened end portions riding in said slots and imparting rotation to said rotatably mounted blades as axial thermal growth of the apparatus causes relative axial movement of said tubular casing and said stator casing.

References Cited in the file of this patent

UNITED STATES PATENTS

| Number | Name | Date |
|---|---|---|
| 2,219,994 | Jung | Oct. 29, 1940 |
| 2,305,311 | Jendrassik | Dec. 15, 1942 |
| 2,337,861 | Adamtchik | Dec. 28, 1943 |
| 2,428,830 | Birmann | Oct. 14, 1947 |